(No Model.)
T. G. BARLOW-MASSICKS.
BRAKE FOR ROAD VEHICLES.
No. 509,645. Patented Nov. 28, 1893.
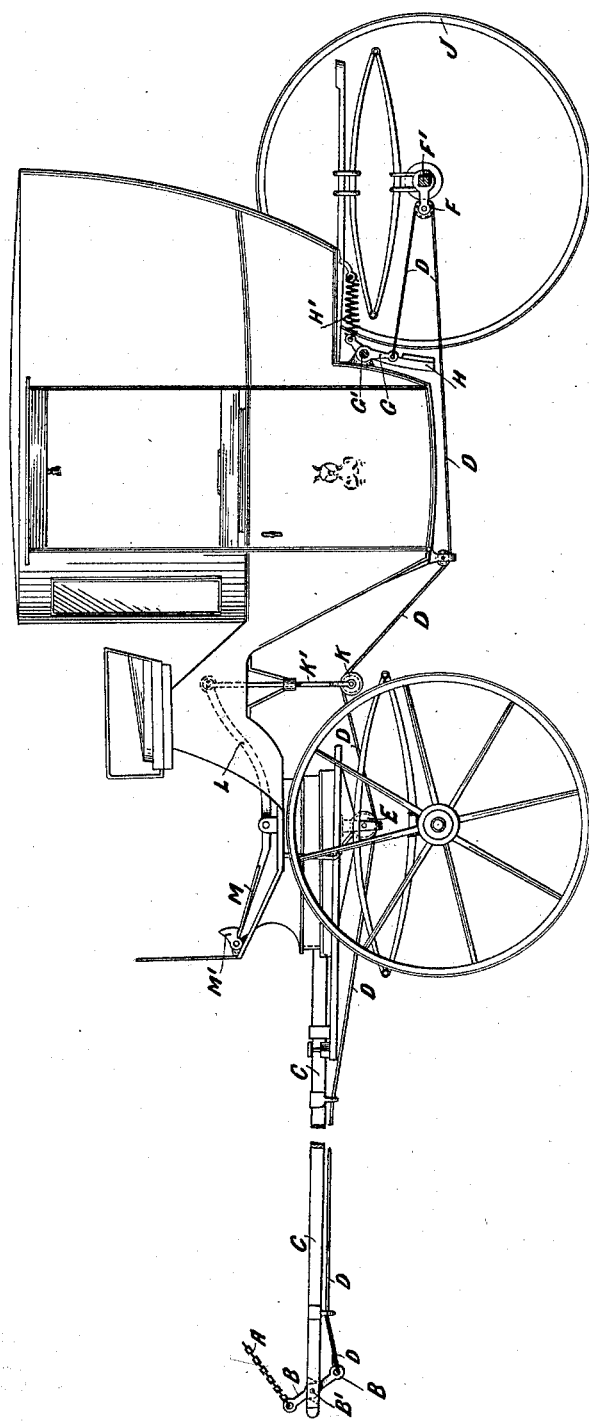

UNITED STATES PATENT OFFICE.

THOMAS G. BARLOW-MASSICKS, OF PRESCOTT, ARIZONA TERRITORY.

BRAKE FOR ROAD-VEHICLES.

SPECIFICATION forming part of Letters Patent No. 509,645, dated November 28, 1893.

Application filed June 12, 1893. Serial No. 477,290. (No model.) Patented in England May 17, 1893, No. 9,883.

*To all whom it may concern:*

Be it known that I, THOMAS GIBSON BARLOW-MASSICKS, a citizen of the United States of America, residing at Prescott, Territory of Arizona, United States of America, but at present of London, England, have invented certain new and useful Improvements in Brakes for Road-Vehicles, (for which a patent has been granted to me in Great Britain, dated May 17, 1893, No. 9,883,) of which the following is a specification.

My invention refers to brakes for road vehicles, which act or come into action when the draft animals back on the pole, but when it is required to "back" the vehicle, the brake is or may be thrown out of action.

The application of my invention will be readily understood by the following description referring to the accompanying drawing, on which is shown so much of a two horse carriage as will be necessary to illustrate the application of my improved brake apparatus thereto.

According to my invention, I connect the pole straps or chains A (for holding back the vehicle) to the end of a vertical lever B, fulcrumed at B' in the end of the pole C, through a slot in which latter the lever B is passed, the extent of motion of the lever B around its fulcrum being limited according to circumstances, by for example, the length of the slot. To the lower or depending arm of the said vertical lever B, and below the fulcrum, I attach a steel wire or other rope, cord, or strap D. This cord D passes backward through suitable guides beneath the pole C, under a pulley E, beneath the king-bolt of the fore-carriage, and beneath the carriage body to a pulley F on the rear axle F', and passing round the pulley F, returns and is fixed to the end of a lever G on the brake shaft G' or the cord may go direct to the brake shaft lever, and in such manner (as hereinafter described) that when the animals pull back on the pole chains or straps A, the brake or brake blocks H are applied to the rear wheels J, and the greater the backward pull, the more the brakes are applied. H' is a spring to take off the brake blocks from the wheels. The brake is thus normally ready for action, and is operated as soon as the animals pull on the pole chains, yet it may be rendered inoperative when desired to allow the vehicle to be "backed" or for other purposes. This I effect by interposing a pulley K, over which the brake chain D passes, say, between the king-bolt and the rear axle F', the pulley K being operated by a treadle under the control of the driver; in the drawing, the pulley K is carried by a guided rod K', the upper end being connected to a lever L, the opposite arm of the latter forming the treadle M.

I leave a slackness in the cord D between the king-bolt guide E and the pulley F of the back wheel axle F', and it is at this slack part that the before mentioned adjustable pulley K (over which the cord passes) is situated. By this device, when the brake is in action, the slackness of the cord D is taken up by the pulley K, while when the position of the pulley is changed, the cord is left slack, and the brake does not act, so that by permanently keeping the treadle M down, the brakes will be applied when the animals back, and vice versa, when the treadle is raised, the effect of the backing of the animals will in no way act on the brake block H.

Suitable provision should be made for keeping the treadle M down and for releasing it when desired, and I have shown on the drawing a hinged catch M' for the purpose, although I do not limit myself to any particular form of catch.

In some cases instead of the cord D passing over the top pulley K as shown, it may pass beneath the said pulley K and above the adjacent pulleys or guides on either side thereof, the effect of this arrangement being to reverse the before described action, so that when the guide or pulley K is raised, the brake is thrown out of action, and is thrown into action again by the depression of the guide K.

I claim—

1. In brakes for road vehicles, brought into action by the backward pull of the draft animals acting through the pole chains, a lever B on the pole and a cord to the brake lever, the combination therewith of a guide K through which the cord D passes, and mechanism for governing the position of the guide K, whereby the cord D may be allowed to become slack, and the brake inoperative, or taut and the brake operative as set forth.

2. In brakes for road vehicles, brought into action by the backward pull of the draft animals, the combination of a two armed lever B fulcrumed in a slot in the forward end of the pole C, the pole chains or straps A, secured to the upper arm of the lever B and rocking the latter on the backing of the animals, a cord or chain D from the lower arm of the lever B to an arm G on the brake shaft G' for communicating the motion of the lever B to the brake shaft, a pulley or guide K through or over which the cord D passes, for gathering the slack of the cord D, and treadle mechanism for operating the guide K, whereby when the cord D is held taut, the brake will be acted upon by the backing of the animals, and when allowed to become slack, the brake will not be applied, as set forth.

In testimony whereof I affix my signature in presence of two witnesses.

THOS. G. BARLOW-MASSICKS.

Witnesses:
    GEO. J. B. FRANKLIN,
    E. W. ECAILLE.